(12) United States Patent
Fanini et al.

(10) Patent No.: US 6,819,111 B2
(45) Date of Patent: Nov. 16, 2004

(54) METHOD OF DETERMINING VERTICAL AND HORIZONTAL RESISTIVITY, AND RELATIVE DIP IN ANISOTROPIC EARTH FORMATIONS HAVING AN ARBITRARY ELECTRO-MAGNETIC ANTENNA COMBINATION AND ORIENTATION WITH ADDITIONAL ROTATION AND POSITION MEASUREMENTS

(75) Inventors: Otto N. Fanini, Houston, TX (US); Gulamabbas A. Merchant, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/302,239

(22) Filed: Nov. 22, 2002

(65) Prior Publication Data

US 2004/0100263 A1 May 27, 2004

(51) Int. Cl.[7] .............................. G01V 3/18; G01V 3/28
(52) U.S. Cl. ............................... 324/339; 702/7; 175/45
(58) Field of Search .................. 175/45; 324/334–343; 702/7

(56) References Cited

U.S. PATENT DOCUMENTS

| | | | | |
|---|---|---|---|---|
| 4,837,517 | A | 6/1989 | Barber | 324/339 |
| 4,909,336 | A | 3/1990 | Brown et al. | 175/45 |
| 4,916,400 | A | * 4/1990 | Best et al. | 324/338 |
| 5,157,605 | A | 10/1992 | Chandler et al. | 364/422 |
| 5,200,705 | A | * 4/1993 | Clark et al. | 324/338 |
| 5,452,761 | A | 9/1995 | Beard et al. | 166/250 |
| RE35,386 | E | 12/1996 | Wu et al. | 175/45 |
| 5,999,883 | A | 12/1999 | Gupta et al. | 702/7 |
| 6,136,155 | A | 10/2000 | Berg | 203/57 |
| 6,147,496 | A | 11/2000 | Strack et al. | 324/343 |
| 6,181,138 | B1 | 1/2001 | Hagiwara et al. | 324/338 |
| 6,218,841 | B1 | * 4/2001 | Wu | 324/338 |
| 6,366,088 | B1 | * 4/2002 | Hagiwara | 324/303 |
| 6,476,609 | B1 | * 11/2002 | Bittar | 324/338 |
| 6,509,738 | B1 | 1/2003 | Minerbo et al. | 324/339 |
| 6,538,447 | B2 | * 3/2003 | Bittar | 324/338 |
| 6,636,045 | B2 | * 10/2003 | Tabarovsky et al. | 324/343 |
| 6,643,589 | B2 | * 11/2003 | Zhang et al. | 702/7 |
| 6,670,813 | B2 | 12/2003 | Strack | 324/323 |
| 6,680,613 | B2 | 1/2004 | Rosthal et al. | 324/339 |
| 6,710,601 | B2 | 3/2004 | Rosthal et al. | 324/323 |
| 2003/0105591 | A1 | * 6/2003 | Hagiwara | 702/7 |

FOREIGN PATENT DOCUMENTS

| | | |
|---|---|---|
| EP | 0840142 A2 | 5/1998 |
| WO | WO02/08214 A1 | 10/2002 |

OTHER PUBLICATIONS

Teruhiko Hagiwara et al.; *Induction Log Responses to Layered, Dipping, and Anisotropic Formations: Induction Log Shoulder–Bed Corrections to Anisotropic Formations and the Effect of Shale Anisotropy in Thinly Laminated Sand/Shale Sequences*, SPE 36508, 1996 SPE Annual Technical Conference and Exhibition, Oct. 6–9, 1996, pp. 141–149, 10 Figs.

* cited by examiner

Primary Examiner—Anjan Deb
Assistant Examiner—Darrell Kinder
(74) Attorney, Agent, or Firm—Madan Mossman & Sriram, P.C.

(57) ABSTRACT

The invention is a method of determining horizontal and vertical resistivity in an anisotropic formation using a combination of orientable triaxial and array antennae conveyed downhole. Measurements are taken at various azimuthal angles about a measuring device at a given depth. Values at each azimuthal orientation can be fit to a curve to yield information on the surrounding formation. Multiple measurements at a given depth and azimuthal orientation can be weighted to obtain an average value. Values from the curve fitting process are used in subsequent inversion processing and reduce the uncertainty of the inversion processing result. Utilization of a three dimensional geometry enables a unique resolution of the orientation of the principle axis of anisotropy, and consequently of horizontal and vertical resistivity, and dip.

26 Claims, 8 Drawing Sheets

METHOD OF DETERMINING VERTICAL AND HORIZONTAL RESISTIVITY, AND RELATIVE DIP IN ANISOTROPIC EARTH FORMATIONS HAVING AN ARBITRARY ELECTRO-MAGNETIC ANTENNA COMBINATION AND ORIENTATION WITH ADDITIONAL ROTATION AND POSITION MEASUREMENTS

BACKGROUND OF THE INVENTION

1. Field of the Invention

The invention relates to measuring parameters of interest in a downhole environment. More specifically, the invention is an apparatus and method for determining resistivities values and relative dip in an anisotropic borehole formation.

2. Background of the Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

The physical principles of electromagnetic induction resistivity well logging are described, for example, in H. G. Doll, Introduction to Induction Logging and Application to Logging of Wells Drilled with Oil Based Mud, Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517 issued to Barber; U.S. Pat. No. 5,157,605 issued to Chandler et al, and U.S. Pat. No. 5,452,761 issued to Beard et al.

U.S. Pat. No. 5,452,761 to Beard et al., the contents of which are fully incorporated herein by reference, discloses an apparatus and method for digitally processing signals received by an induction logging tool having a transmitter and a plurality of receivers. An oscillating signal is provided to the transmitter, which causes eddy currents to flow in a surrounding formation in the frequency domain, transient domain or a combination of both. The magnitudes of the eddy currents are proportional to the conductivity of the formation. The eddy currents in turn induce voltages in the receivers. The received voltages are digitized at a sampling rate well above the maximum frequency of interest. Nyquist sampling criteria specifies the sampling frequency to be at least twice the maximum frequency present in the signal being digitized in order to avoid aliasing distortion of the digitized signal. The digitizing window is synchronized to a cycle of the oscillating current signal. The oscillating current could be a combination of sinusoidal frequencies for a survey in the frequency domain or a repetitive transient current source for a survey in the transient domain. For the later the measured data would be transformed to the frequency domain for resistivity measurement data analysis, processing, inversion to define resistivity properties and structural characteristics of an earth formation resistivity model. Corresponding samples obtained in each cycle are cumulatively summed over a large number of such cycles. The summed samples form a stacked signal. Stacked signals generated for corresponding receiver coils are transmitted to a computer for spectral analysis. Transmitting to the surface the stacked signals and not all the individually sampled signals, reduces the amount of data that needs to be stored or transmitted. A Fourier analysis is performed of the stacked signals to derive the amplitudes of in-phase and quadrature components of the receiver voltages at the frequencies of interest. From the component amplitudes, the conductivity of the formation can be accurately derived.

A limitation to the electromagnetic induction resistivity well logging instruments such as that discussed in Beard et al. is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art, these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones that are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 6,147,496 to Strack et al. teaches the use of an induction logging tool in which at least one transmitter and at least one receiver with orientation limited to orthogonal directions. By performing measurements with the tool with at least two different frequencies, it is possible to substantially reduce the effect of borehole and invasion and to determine the orientation of the tool to the bedding planes.

U.S. Pat. No. 5,999,883 issued to Gupta et al. (the "Gupta patent"), the contents of which are fully incorporated here by reference, discloses a method for determining the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes which is also perpendicular to the instrument axis. A relative angle of rotation of this magnetic moment perpendicular to the orthogonal axes is calculated from the receiver signal including the signals measured perpendicular to the instrument axis. An intermediate measurement tensor is calculated by rotating magnitudes of the receiver signals through a negative of the angle of rotation corresponding to a first coordinate transformation. A relative angle of inclination of one of the orthogonal axes which is parallel to the axis of the instrument is calculated, from the rotated magnitudes, with respect to a direction of the vertical conductivity. The initially rotated magnitudes are rotated through a negative of the angle of inclination corresponding to the a coordinate transformation. The resistivity anisotropy evaluation is referenced to the principal axis of transverse anisotropy (in a simpler case) and the bedding plane. A similar procedure for a more general case could address the case of biaxial anisotropy in layered media where $R_{hx}$ differs from $R_{hy}$. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

U.S. patent application Ser. No. 09/676,097 by Kriegshauser et al, the contents of which are fully incorporated herein by reference, discusses the use of a multi-component induction logging tool in which five components of the magnetic field are recorded. This tool, which is marketed under the name 3DEX™ by Baker Hughes Inc., measures three principal components $H_{xx}$, $H_{yy}$, $H_{zz}$ and two cross-components $H_{xy}$ and $H_{xz}$. The measured data from 3DEX™ tool are unfocused and thus inversion is necessary in interpreting the 3DEX™ data.

The 3DEX™ device contains three transmitters and three receivers directed along orthogonal axes (x, y, z) with the z-component along the longitudinal axis of the drilling tool. The 3DEX™ device gives knowledge of resistivities and provides a process for general inversion of data. 3DEX™ is useful in determining orientation, given a sufficient selection of initial conditions. However, the 3DEX™ device collects data from the non-invaded zone to put in its model. Furthermore, the 3DEX™ device is sensitive to the initial conditions used in its data inversion. There is a need to provide a method of 3DEX™ data inversion with improved initial conditions to improve convergence, accuracy and stability of results.

Pending U.S. patent app. Ser. No. 10/091,310 by Zhang et al uses a method for the simultaneous inversion of measurements made by a multi-component logging tool to obtain a layered resistivity model and formation inclination angle and azimuth. A model that includes horizontal and vertical resistivities is used to generate a simulated tool response. An iterative solution that gives an improved match between the model output and the field observations is obtained using a global objective function. The global objective function is defined as a sum of a data objective function (difference between the model output and the observed data) and a model objective function that stabilizes the inversion procedure by placing a penalty on large changes in the model at each iteration. The measurements may be made by an electromagnetic logging tool having an axis inclined to the normal to the bedding planes of the formation. The logging tool includes transmitters and/or receivers with coils inclined to the axis of the tool. In a preferred embodiment of the invention, the data objective function is defined in the coil coordinate system. Surveying of the borehole and orientation sensors on the tool provides the necessary information for rotating the model output to the coil coordinate system.

In a technical paper entitled "A New Method to Determine Horizontal Resistivity in Anisotropic Formations Without Prior Knowledge of Relative Dip," 37$^{th}$ SPWLA Annual Logging Symposium, New Orleans, Jun. 16–19, 1996, Hagiwara discloses a method to determine the horizontal resistivity for deviated boreholes or dipping formations using two conventional induction-type resistivity measurements. However, Hagiwara's method does not provide the relative dip angle. To obtain the relative dip angle, the formation anisotropy must be known. Moreover, Hagiwara shows that, for conventional induction logging tools (in which the transmitter and receiver antennas are oriented co-axially with the tool), it is impossible to obtain all three parameters (horizontal resistivity, vertical resistivity, and relative dip angle) simultaneously. The reasons such a simultaneous solution is not possible using conventional induction logging tools is that, in the response of such tools, the vertical resistivity and the relative dip angle are coupled (i.e., they are not independent).

European Patent Application No 0840142 by Wu discloses a method and apparatus for determining horizontal conductivity, vertical conductivity, and relative dip angle during a drilling operation. If the relative dip angle is unknown, Wu's technique involves the formulation of a relationship between the dielectric constants of the formation to the anisotropic conductivities of the formation. However, in the proof by Hagiwara mentioned above, the dielectric constants are assumed quantities, and their contribution to the phase shift resistivity is minimal. Therefore, even if the dielectric constants are known, the vertical resistivity and the relative dip angle are still coupled and do not allow for a simultaneous solution.

U.S. Pat. No. 6,136,155, issued to Bittar, discloses an apparatus and method for determining resistivities in a downhole environment. The invention of Bittar '155 is directed to an improved downhole method and apparatus for simultaneously determining the horizontal resistivity, vertical resistivity, and relative dip angle for anisotropic earth formations. The antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, it is also applicable to wireline and possible other applications.

The method of Bittar '155 is designed using a two-dimensional geometry which does not include the relative azimuthal position of the measurements in the borehole needed to be considered in order to uniquely resolve the orientation of the principle axis of anisotropy and to consequently resolve $R_h$, $R_v$ and the relative dip. A three-dimensional measurement system is required to properly observe and interpret the resistivity tensor and define its orientation in an anisotropic media. Bittar '155 neglects the azimuthal position of the measurements necessary to resolve the principal axis of anisotropy even for the simple case of transverse anisotropy (TI). The outlined method for measuring horizontal magnetic dipole and vertical magnetic dipole further demonstrate the specifications to be two-dimensional and neglects the azimuthal position of the measurements necessary to resolve the principal axis of anisotropy, even for the simple case of transverse anisotropy. Computed and measured resistivities associated with the induced voltages of Bittar '155 do not have the necessary parameterization to properly and accurately describe the measurements and their respective position with respect to the observed resistivity tensor direction. The present invention addresses the shortcomings of Bittar '155.

There is a need for a fast and robust method for determination of a stable and unique anisotropy solution in conductive borehole environments. A three-dimensional measurement system is required to properly observe and interpret the resistivity tensor in an anisotropic media. The present invention satisfies this need.

SUMMARY OF THE INVENTION

The present invention is an apparatus and method for a determining a resistivity property of earth formation penetrated by a borehole. A plurality of multi-component resistivity sensors on a logging tool are used for obtaining measurements at a plurality of tool-face angles of said logging tool within the borehole. The measurements made by the resistivity sensors are represented by an associated function (such as a sinusoid) of the tool-face angles. The resistivity property is derived from these functions. The logging tool may be conveyed into the borehole on a wireline or a drilling tubular. The toolface angles may be obtained with an orientation sensor such as a magnetometer, accelerometer, or gyroscope.

Measurements made at a plurality of depths may be analyzed jointly. This, together with binning of the data, particularly when measurements are made while drilling, can improve the signal-to-noise ratio, thus improving the determination of resistivity.

BRIEF DESCRIPTION OF THE DRAWINGS

The application is best understood with reference to the following drawings wherein like numbers in different figures refer to like components FIG. 1 (Prior Art) shows a typical bottom hole assembly for drilling and steering in a wellbore suitable for use in the present invention.

DESCRIPTION OF THE PREFERRED EMBODIMENT

Figure 1:
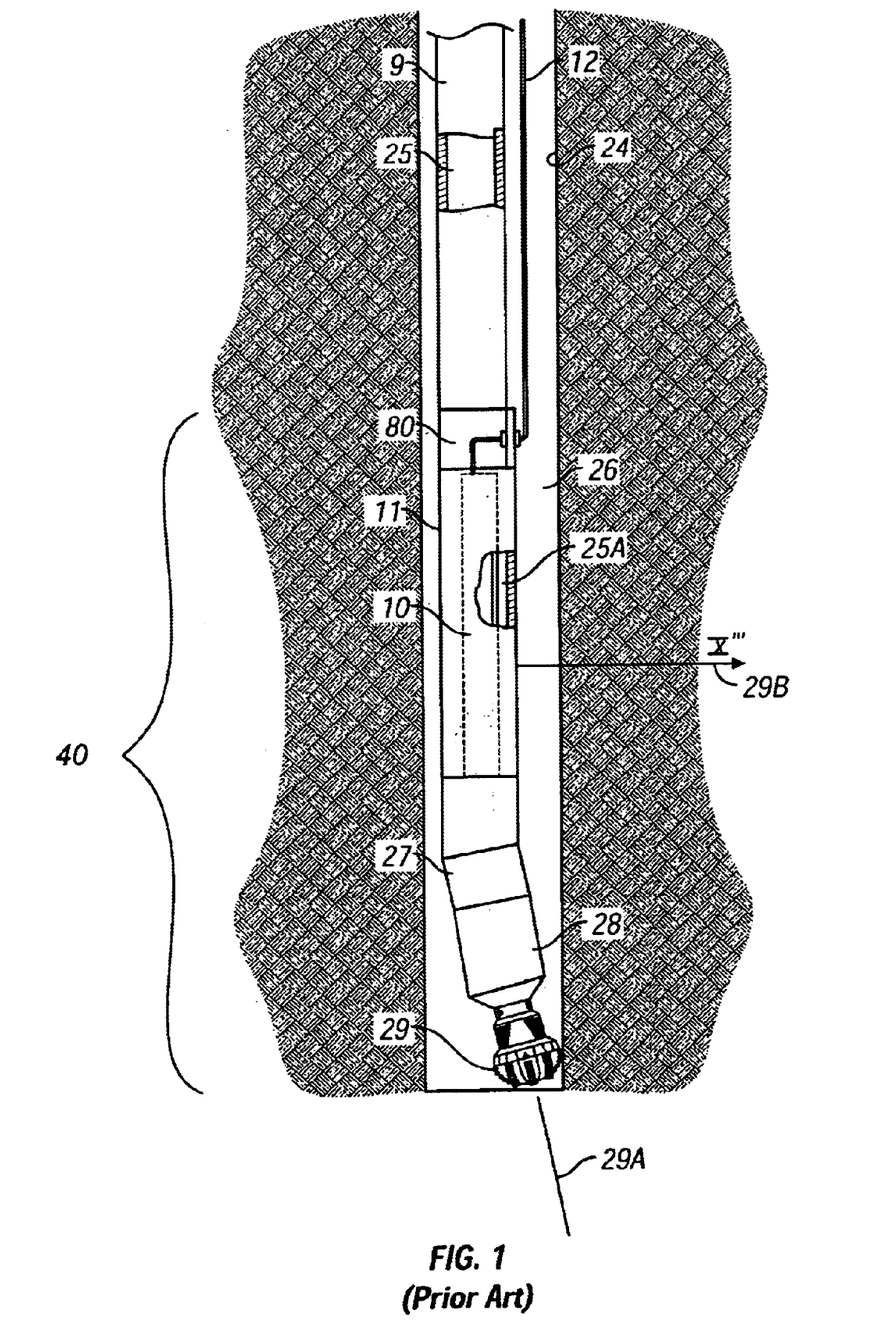

FIG. 1 shows details of a typical bottom hole assembly suitable for use in the invention. The assembly 40 is shown attached to drill pipe segment 9 in the borehole 24. The bottom hole assembly comprises a drill collar 11, a bent sub or subassembly 27, and a mud motor in unit 28 for driving the rotary drill 29 about axis 29a. Within the drill collar is a gyroscope-based survey tool 10 having inertial angular rate sensor means. The mud motor that drives the rotary drill is driven by drilling mud flow pumped from the surface downwardly through the hollow interior 25 of the drill pipe 9 and through an annular space 25a within 11 and around the survey tool 10. Mud also flows through sub 28 to the motor in unit 28.

The mud flow returns to the surface in the annular space or annulus 26 between the outside of the drill collar/drill pipe and the borehole wall 24. A wireline 12 that is internally connected to the survey tool 10 is shown exiting the side of the drill collar through a well known "side entry" subassembly indicated at 80. The wireline then runs to the surface in the same annular space 26 which carries the return mud flow from the mud motor. The bend angle of the bent subassembly 27 is selected based on the desired rate to change in direction vs. distance. Angles in the range of one half to three degrees may be considered typical. A reference direction vector, X''', 29b is shown that lines in the upright plane formed by the bent subassembly, i.e. axis 29a. It is well known in directional drilling that steering the direction of deviation of the borehole is achieved by rotating the entire drill string including the bottom hole assembly until a reference vector in the plane of the bent subassembly points in the desired direction. When it is pointed in the desired direction, the weight of the drill string on the bit causes the bit to deviate in direction along this reference direction. Thus the process of steering the bit along the desired trajectory is seen to be one of measuring the direction of the reference vector 29, displaying this measurement to the driller, and adjustment by the driller of the orientation of the bottom hole assembly as necessary. A tool face mark, or tool field connection key, enables proper azimuthal reference and alignment of the magnetic moment measurements and other azimuthal measurements. This alignment can be critical when the receiver and transmitter can be in separate subassemblies. Measurements that can be made using such and apparatus include borehole imaging (nuclear, acoustic, resistivity), motion and position detection measurements (using inclinometers, magnetometers, gyroscopes, accelerometers, etc.), deep azimuthally sensitive acoustic and resistivity measurements, etc.

Figure 2:
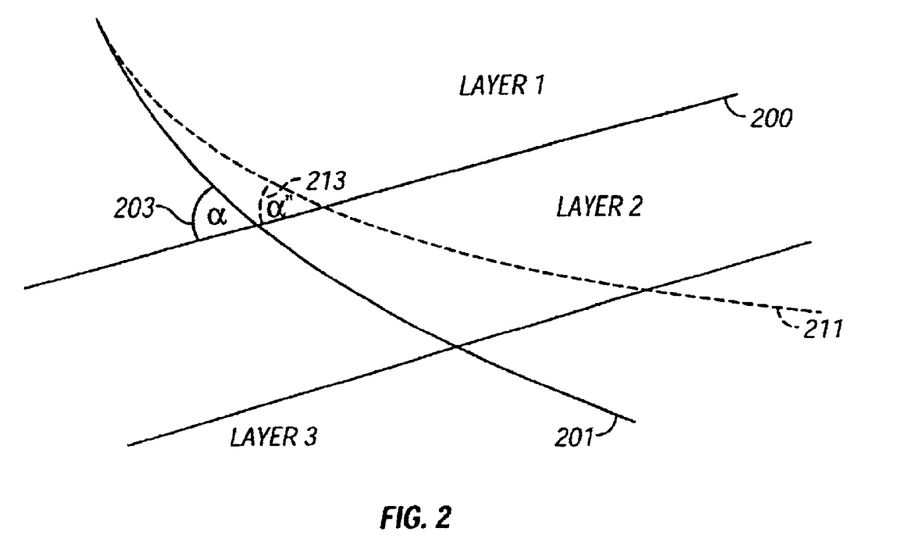
FIG. 2 shows a deviation of planned trajectory from actual trajectory due to deviation of well placement.

FIG. 2 shows a planned drill trajectory 201 and an actual drill trajectory 211 through a formation layer. When drilling is planned, a well trajectory is designed for the reservoir development using a given geological model, shown as Layers 1, 2, and 3. Based on this model, a 2 D image is created based on processing of measurements with azimuth versus depth for the well path and geological models. A planned trajectory for the well 201 strikes a formation boundary 200 at an angle $\alpha$ (203). The actual trajectory for the well 211 can end up striking the formation boundary 200 at a different angle $\alpha'$ (213). Angle $\alpha'$ represents the dip-deviation due to a change in well placement. As the well is drilled, another 2 D image is processed based on actual magnetic moment measurements. This image based on actual measurement can be compared with the image based on well and formation model data. A differential image of deeper formation investigation can be produced and used to alert drillers of deviation. These images can be weighted by structural features or material properties based on the operator's objective for image utilization. Shallow borehole image data can be incorporated in the preparation and refinement of the image discussed above based on deeper measurements.

Figure 3:
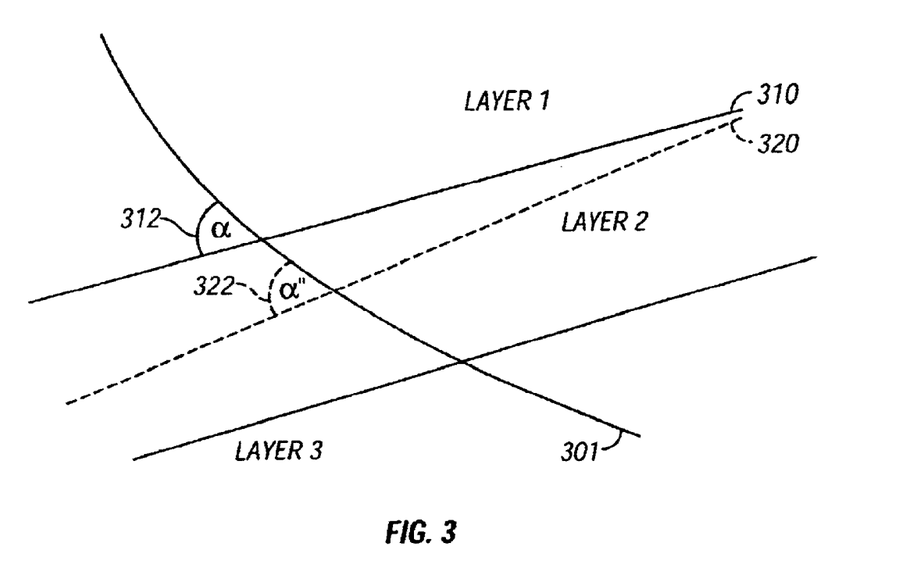
FIG. 3 shows a deviation of actual geological model to predicted geological model.

FIG. 2 illustrates how the relative dip angle of a given boundary layer intersected by the well path can deviate from the modeled value as the actual well drilling placement deviates from the plan and model. FIG. 3 illustrates how the relative dip angle of a given boundary layer intersected by the well path can deviate as the geological model deviates from the predicted model. Path 301 represents the planned well drill path. A boundary layer of the actual geological model is shown as 320 and the predicted geological model is shown as 310. The angle α 312 represents the predicted relative dip of the well path 301 and the angle α" 322 represents the predicted relative dip due to the geological model change from the predicted model.

Figure 6:
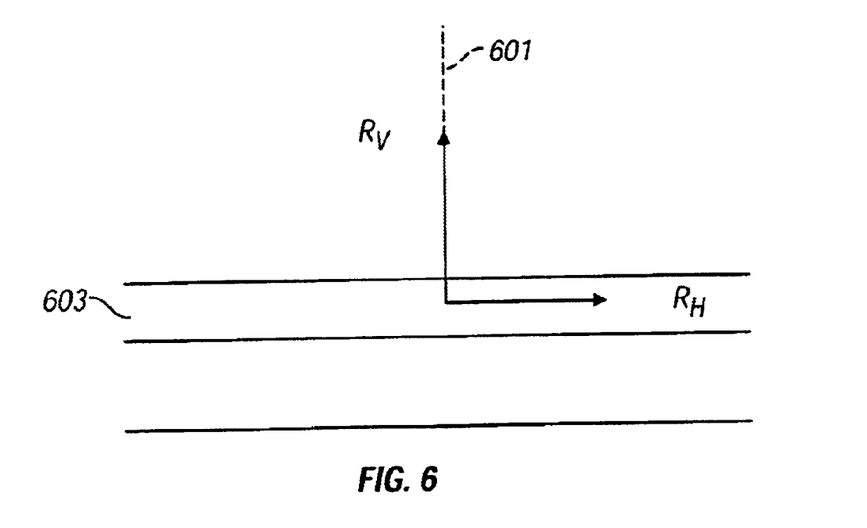
FIG. 6 shows a typical bedding formation.

An anisotropic bedding layer is shown in FIG. 6. The resistivity in a direction parallel to the plane of the formation is known as the horizontal resistivity, $R_h$, and the resistivity in the direction perpendicular to the plane of the formation is known as the vertical resistivity $R_v$, which in a particular case is oriented in the figure along the principal axis of symmetry 601 for a transverse anisotropic media (TI). Horizontal resistivity values do not change in the bedding plane 603 for transverse isotropic media. The relative dip angle is the angle between the borehole axis (tool axis) and the normal to the plane of the layered formation. If the axis of the tool is sufficiently inclined with respect to the normal of the formation plane (i.e., for non-zero relative dip angle), the rock anisotropy affects also the derived horizontal resistivity measurements.

Five coordinate systems are to be considered for a complete description of tool orientation. In a most general case where a bedding formation has dip, the normal to the bedding plane and the Z-axis of the absolute reference frame (earth reference frame) are distinct. The Z-axis of the a first coordinate system known as earth reference frame ($R_N$) points downward in the direction of the earth's gravitational pull. A second coordinate system, $R_D$, denotes the coordinate system corresponding to the dipping bedding plane. The normal to the plane formed by the Z-axes of the $R_N$ and $R_D$ define a Y-axis common to both $R_N$ and $R_D$. The X-axis in each reference frame is the normal to respective ZY-planes. In the case where the formation is not dipping, the two systems are identical and the Y-axis and X-axis can be chosen to point east and north respectively. $R_D$ can be transformed into $R_N$ by rotating the Z-axis of $R_D$ into the Z-axis of $R_N$ around the common Y-axis through an angle α between the two Z-axes corresponding to the bed dipping angle.

Figure 4:
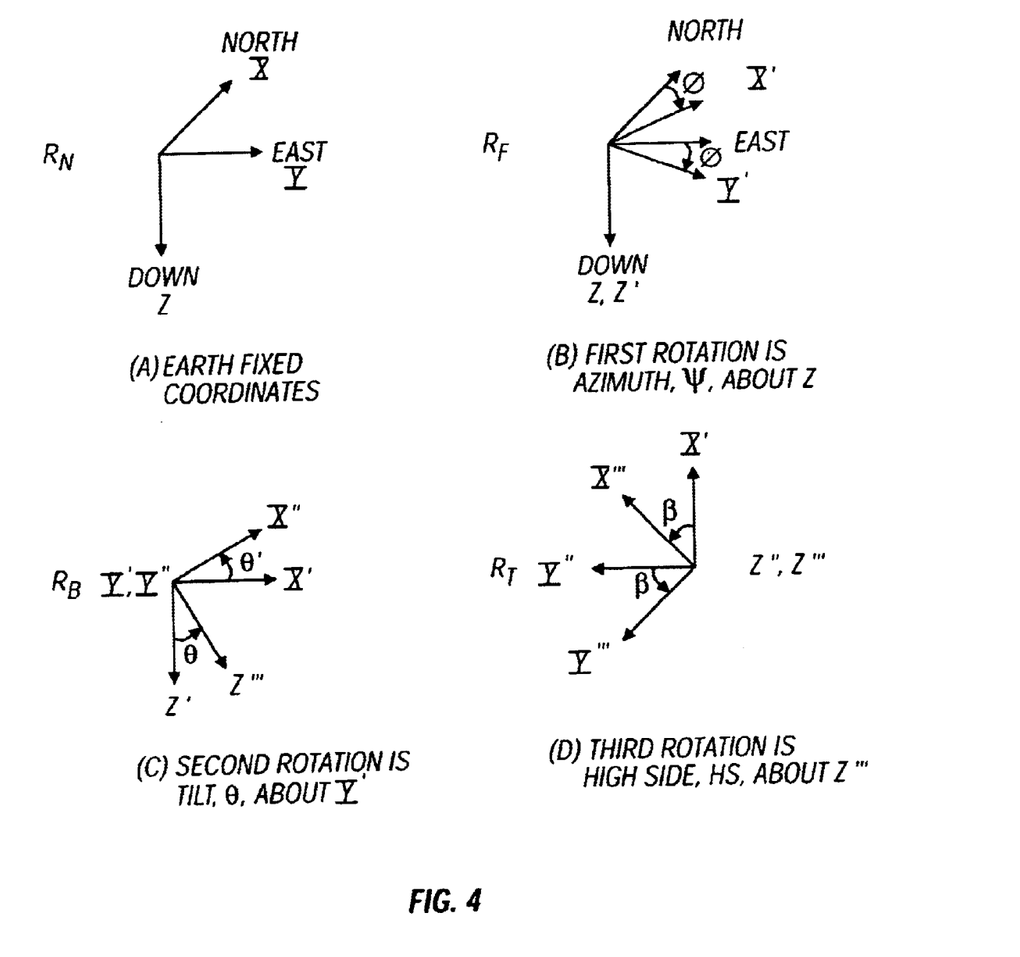
FIG. 4 shows the effects of rotations on the coordinate systems of the invention.

FIG. 4 shows how the reference vector X''', 29b of FIG. 1, is defined in relation to the earth-fixed coordinate ($R_N$) used for well planning, drill steering, and surveying the borehole trajectory in space. At (a) an isometric view of the absolute reference frame (earth reference frame) $R_N$ is shown with the three reference directions as North, East, and Down is shown. The designation of these axes as North and East is meant only for the purpose of clarity and does not limit the scope of the invention. The directions of $R_N$ are labeled X, Y, and Z respectively.

A third coordinate system $R_F$, referred to herein as the formation system, comprises the plane formed by the borehole trajectory and the Z-axis of $R_N$. In a straight borehole trajectory, an angle φ is the azimuth angle of the plane in which the tool is dipping, measured with respect to the Z-axis of the formation system $R_N$. The Z'-axis of $R_F$ is the same as the Z-axis of $R_N$, making it the rotation axis. The X'-axis of $R_F$ is obtained by rotating the X-axis of $R_N$ horizontally around the Z'-axis by angle φ into the plane formed by the borehole trajectory and the Z-axis. The Y'-axis of $R_F$ is orthogonal to the X' and Z'. In an anisotropic medium with transverse anisotropy (TI) the formation plane is perpendicular to the principal axis or anisotropy. For this anisotropy case (TI) the horizontal resistivity ($R_h$) is measured in the formation bedding plane and the value of $R_h$ remains constant with directions within this plane. The vertical resistivity ($R_v$) is measured in a direction perpendicular to the formation bedding plane.

At (b) of FIG. 4 the reference directions shown in (a) are rotated by the angle φ (phi) about the Z-axis. The angle, φ (phi), is by definition, the azimuthal direction of the borehole, and the resulting new axes are labeled X' and Y'. Z is unchanged in direction by the azimuthal rotation but it is labeled Z' for consistency.

A fourth coordinate system $R_B$ is the reference frame local to the borehole trajectory. The borehole trajectory is at an angle θ (the relative dip angle) with respect to the Z'-axis of $R_F$. $R_B$ is obtained by rotating the Z'-axis of $R_F$ by the dip angle θ into the borehole trajectory (Z''-axis) using Y'-axis as the turning axis. The resulting respective axes of $R_B$ are denoted as X'', Y'', and Z'', where Y' and Y'' are equivalent.

At (c) in FIG. 4 a view is shown looking along the direction of the Y' vector at (b). A further rotation, θ (theta), is shown about the Y'-axis. This rotation is defined as the tilt or inclination angle for the borehole since the Y'-axis is true horizontal in this view. Note that the Z'' axis is still along the borehole axis.

A fifth system is the tool reference frame $R_T$ obtained by rotating the X'' of $R_B$ around its Z''-axis (i.e. tool and borehole axis) through an angle β lining up said X''-axis with the X'''-directed transmitter coil. The corresponding axes are denoted as X''', Y''', and Z''', which line up with the X, Y, and Z measurement coils of the tool.

At (d) a view is shown along the Z'' or borehole axis, and the influence of the final rotation, β (beta), is shown. The vector X''' is normal to the borehole direction and the plane of the bend in the bent subassembly (27 in FIG. 1) is by definition installed in this direction. The vector X''' in FIG. 2(d) is thus the same as the reference direction vector X''' 29b shown in FIG. 1.

The rotation mappings between various coordinate systems is shown herein in matrix representation, and is given below. The mapping from dipping formation plane coordinate system $R_D$ to earth reference frame $R_N$ is given as $$\Gamma_\alpha : R_D \rightarrow R_N \qquad (1)$$

$$\Gamma_\alpha = \begin{bmatrix} \cos(\alpha) & 0 & -\sin(\alpha) \\ 0 & 1 & 0 \\ \sin(\alpha) & 0 & \cos(\alpha) \end{bmatrix}$$

Rotation matrix $\Gamma_\phi$ rotates vectors through angle φ from the earth reference frame $R_N$ to the borehole plane coordinate system $R_F$:

$$\Gamma_\varphi : R_N \rightarrow R_F \qquad (2)$$

$$\Gamma_\varphi = \begin{bmatrix} \cos(\varphi) & \sin(\varphi) & 0 \\ -\sin(\varphi) & \cos(\varphi) & 0 \\ 0 & 0 & 1 \end{bmatrix}$$

The mapping from borehole plane coordinate system $R_F$ to borehole trajectory coordinate system $R_B$ is $$\Gamma_\theta : R_F \rightarrow R_B \qquad (3)$$

$$\Gamma_\theta = \begin{bmatrix} \cos(\theta) & 0 & \sin(\varphi) \\ 0 & 1 & 0 \\ \sin(\varphi) & 0 & \cos(\theta) \end{bmatrix}$$

The mapping of the borehole trajectory coordinate system $R_B$ to the local tool reference frame $R_T$ is given by $$\Gamma_\beta : R_B \to R_T \quad (4)$$

$$\Gamma_\beta = \begin{bmatrix} \cos(\beta) & \sin(\beta) & 0 \\ -\sin(\beta) & \cos(\beta) & 0 \\ 0 & 0 & 1 \end{bmatrix}$$

In order to model each of the (X, Y, Z) transmitter and the receivers of the tool reference frame, it is sufficient to resolve them in the borehole plane coordinate system $R_F$. This is done by using the above transformations in sequence as follows:

$$R_T \xrightarrow{\Gamma_\beta^{-1}} R_B \xrightarrow{\Gamma_0^{-1}} R_F \quad (5)$$

$$\begin{bmatrix} M_{x''x} & M_{y''x} & M_{z''x} \\ M_{x''y} & M_{y''y} & M_{z''y} \\ M_{x''z} & M_{y''z} & M_{z''z} \end{bmatrix} = \Gamma_\theta^{-1}\Gamma_\beta^{-1} = \begin{bmatrix} M_{x''} & 0 & 0 \\ 0 & M_{y''} & 0 \\ 0 & 0 & M_{z''} \end{bmatrix}$$

The double-prime coordinates indicate the coordinates of the tool reference frame as seen in the tool reference frame. Each term in the left-hand side matrix represents a component of the transmitter resolved in the borehole-plane reference frame $R_F$. Thus, for example, $M_{x''y}$ represents the component in the y-direction in the borehole-plane coordinate system of the x-transmitter. The magnetic field in each of receivers in the formation reference is obtained from:

$$\begin{bmatrix} H_{x''x} & H_{y''x} & H_{z''x} \\ H_{x''y} & H_{y''y} & H_{z''y} \\ H_{x''z} & H_{y''z} & H_{z''z} \end{bmatrix} = \begin{bmatrix} G_{xx} & 0 & G_{zx} \\ 0 & G_{yy} & 0 \\ G_{xz} & 0 & G_{zz} \end{bmatrix} \begin{bmatrix} M_{x''x} & M_{y''x} & M_{z''x} \\ M_{x''y} & M_{y''y} & M_{z''y} \\ M_{x''z} & M_{y''z} & M_{z''z} \end{bmatrix} \quad (6)$$

where $G_{uv}$=the magnetic field produced by a u-directed unit transmitter dipole in a v-directed receiver, and $H_{u''v}$=the magnetic field produced by the u-directed transmitter in the tool reference frame on the v-direction receiver in the formation reference frame.

The above magnetic field matrix needs to be converted back to the tool reference frame in order to obtain the fields measured by the tool in each of its receivers. This is accomplished by the following transformation:

$$\begin{bmatrix} H_{x''x''} & H_{y''x''} & H_{z''x''} \\ H_{x''y''} & H_{y''y''} & H_{z''y''} \\ H_{x''z''} & H_{y''z''} & H_{z''z''} \end{bmatrix} = \Gamma_\beta\Gamma_\theta \begin{bmatrix} H_{x''x} & H_{y''x} & H_{z''x} \\ H_{x''y} & H_{y''y} & H_{z''y} \\ H_{x''z} & H_{y''z} & H_{z''z} \end{bmatrix} \quad (7)$$

$$= \Gamma_\beta\Gamma_\theta \begin{bmatrix} G_{xx} & G_{yx} & G_{zx} \\ G_{xy} & G_{yy} & G_{zy} \\ G_{xz} & G_{yz} & G_{zz} \end{bmatrix}$$

$$\Gamma_\theta^{-1}\Gamma_\beta^{-1}\begin{bmatrix} M_{x''} & 0 & 0 \\ 0 & M_{y''} & 0 \\ 0 & 0 & M_{z''} \end{bmatrix}$$

where $H_{u''v''}$=the magnetic field produced by the u-directed transmitter in the tool reference frame in the v-directed receiver in the tool reference frame. The specific selection of the coordinate system and formation orientation result in zero values for some of the tensor components. The fields in the formation reference in equation (7) are written for the most general case of full tensor anisotropy. They reduce to the fields of the previous equation (6) in the case of layered formation with transverse anisotropy (TI media).

If the tool has only two transmitters of unit magnetic moments and the corresponding two receivers in X and Z directions, we can only measure $H_{x''x''}$, $H_{x''z''}$ (=$H_{z''x''}$) and $H_{z''z''}$.

$$H_{x''x''}=\cos^2\beta[\cos^2\theta \cdot G_{xx}+\sin 2\theta \cdot G_{zx}+\sin^2\theta \cdot G_{yz}]+\sin^2\beta \cdot G_{yy}$$

$$H_{y''y''}=\sin^2\beta[\cos^2\theta \cdot G_{xx}+\sin 2\theta \cdot G_{zx}+\sin^2\theta \cdot G_{zz}]+\sin^2\beta \cdot G_{yy}$$

$$H_{z''z''}=\sin^2\theta \cdot G_{xx}-\sin 2\theta \cdot G_{zx}+\cos^2\beta \cdot G_{zz}$$

$$H_{z''x''}=H_{x''z''}=\cos\beta \cdot [\sin\theta \cdot \cos\theta \cdot (G_{zz}-G_{xx})+\cos 2\theta \cdot G_{zx}]$$

$$H_{z''y''}=H_{y''z''}=\sin\beta \cdot [\sin\theta \cdot \cos\theta \cdot (G_{zz}-G_{xx})+\cos 2\theta \cdot G_{zx}]$$

$$H_{x''y''}=H_{y''x''}=\sin\beta \cdot \cos\beta \cdot [\cos^2\theta \cdot G_{xx}+\sin 2\theta \cdot G_{xx}+\sin^2\theta \cdot G_{zz}-G_{yy}] \quad (8)$$

There are four primary unknowns ($\beta$, $\theta$, $R_h$, $R_v$) to be determined. As an intermediate step, we first determine $\beta$, $\theta$, $G_{xx}$, $G_{zx}$, $G_{zz}$, $G_{yy}$. There is clearly not enough information measured to resolve the all the unknowns unless some of the parameters are known from some other independent measurements.

Figure 5:
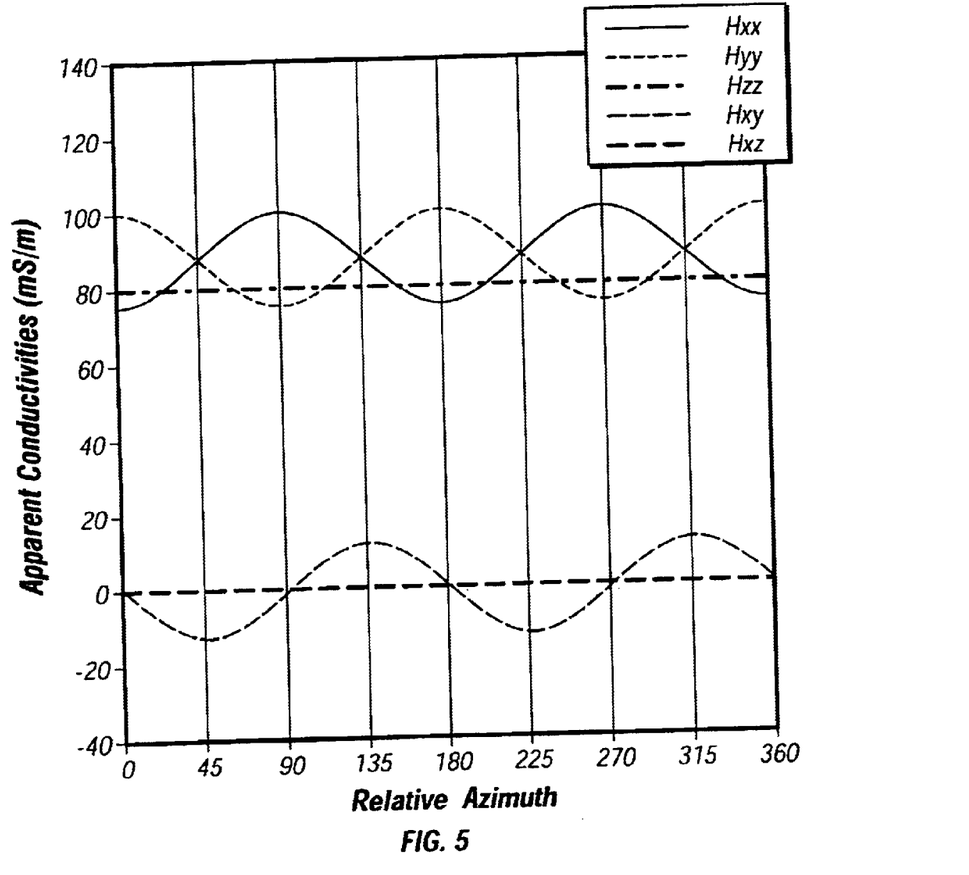
FIG. 5 shows the measurements in a low frequency simulation for a triaxial tool.

FIG. 5 shows resultant measurements of an equivalent low frequency simulation for a triaxial tool with vertical magnetic dipoles (VMD) oriented along the tool axis (Z) and two orthogonal horizontal (or deviated) magnetic dipoles (HMD$_x$, and HMD$_y$) oriented perpendicular to the tool axis. In the example of FIG. 5, a horizontal wellbore is drilled into the formation. The formation has resistivity values of $R_h$=7 $\Omega$-m and $R_v$=14 $\Omega$-m. The figure illustrates the dependence of horizontal or deviated coil measurements to relative azimuth tool position with respect to the formation resistivity tensor (i.e. $R_h$ and $R_v$ for the TI anisotropy case). At low frequencies (60 kHz), apparent conductivities computed from received magnetic fields measurements vary with relative azimuth position with respect to the resistivity anisotropy tensor orientation. Values of $H_{zz}$ are shown to be independent of angular orientation, while $H_{xx}$ and $H_{yy}$ show a sinusoidal variation with azimuth. Cross-component $H_{xy}$ shows a variation of the conductivity measurement with azimuth, although with a quarter-phase difference. The set of curves enables a determination of orientation.

The inversion routine to resolve the relative dip, vertical and horizontal resistivity utilizes the forward models with field equations and measurements described by formulae discussed above. Any proven inversion techniques could be applied, such as the least square or Marquardt methods, for example. An example of an inversion technique for the 3DEX$^{SM}$ measurement tool is described in U.S. pat application Ser. No. 10/091,310 of Zhang et al, having the same assignee as the present application and the contents of which are incorporated herein by reference. The array of tool measurement $H_{zz}$, $H_{zy}$, $H_{xz}$, $H_{xx}$, $H_{xy}$, $H_{yx}$, $H_{yz}$, and $H_{yy}$ are recorded along with respective relative azimuth position measured with respect to an external reference (vertical/gravity, magnetic north or both). The inversion method of Zhang et al employs a model comprising quantities for thickness of layers, resistivities of layers, and lengths and resistivities of invaded zones. In the case of measurement-while drilling, the effects of invasion are likely to be small. Hence, a full utilization of Zhang et al, requiring additional array measurements to obtain parameters of the invaded zone, may not be necessary.

U.S. patent app. Ser. No. 10/167,322 to Dubinsky et al, having the same assignee as the present application and the contents of which are incorporated herein by reference, describes a method of determining the rate of penetration of a downhole drilling assembly conveyed in a borehole during drilling of the borehole. An accelerometer is a typical means of making measurements on the downhole assembly, indicative of axial motion of the drilling assembly. Other typical means include such items as an inclinometer, a magnetometer, and a gyroscope, etc. In one embodiment of the invention, these measurements are used to determine the axial velocity of motion. Maxima or minima of the velocity are identified and from these, the rate of penetration is determined assuming that the penetration occurs in discrete steps. Alternatively, maxima or minima of the axial displacement are determined and these are used to obtain a depth curve as a function of time. In an alternate embodiment of the invention, the rate of penetration is determined from the average acceleration of the downhole assembly and its instantaneous frequency. The determined rate of penetration may then be used to control the operation of a logging while drilling tool. Specifically, the activation of the transmitter of the logging tool is controlled to give measurements at desired depths. This is particularly desirable in array logging tools such as are used in borehole-compensated acoustic logging. Measurements of azimuthal direction may be made by using a downhole measuring device, such as a magnetometer and/or accelerometers, gyroscope, or inclinometer, etc.

Figure 7:
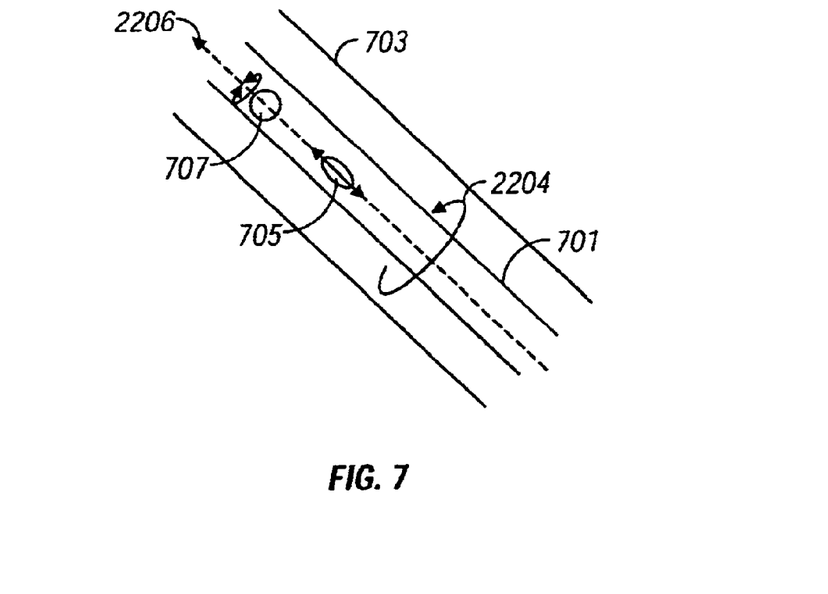
FIG. 7 shows a measuring device conveyed within a borehole.

FIG. 7 shows a drilling string 701 conveyed within a borehole 703 along the drill path 2206. The drilling string is conveyed to at least one depth within the borehole. The drilling string comprises a means (i.e. accelerometer, gyroscope, magnetometer, etc.) for obtaining measurements of longitudinal motion 705 and for measuring relative angular rotation 707. The tool travels along the drill path with a vertical velocity $v_z(t)$ and an acceleration $a_z(t)$. The tool also rotates around its longitudinal axis as indicated by arrow 2204 with an angular velocity $\omega(t)$ and angular acceleration $a_\omega(t)$. All these dynamic variables can represent the basic tool movements and position inside the borehole.

The method of the present invention could be used with data acquired with a logging instrument conveyed on a wireline and also with data acquired using a measurement while drilling (MWD) apparatus conveyed on a drilling tubular such as a drill string or coiled tubing. In particular, when used with MWD measurements, this directional information may be used for controlling the direction of drilling and maintaining the position of the borehole relative to beds in the proximity of the borehole.

A MWD tool conveyed to the borehole performs measurements with the various transmitter receiver array combinations and configurations. These measurements have azimuthal sensitivity and could be symmetric or asymmetric with respect to the tool axis. These measurements are deeper electromagnetic data than what is obtained from MWD image tools or other shallow azimuthal tools. In order to improve signal to noise ratio and facilitate interpretation, these azimuthal measurements could be organized by depth interval (down to the desired depth resolution) and azimuth sector.

Figure 8A:
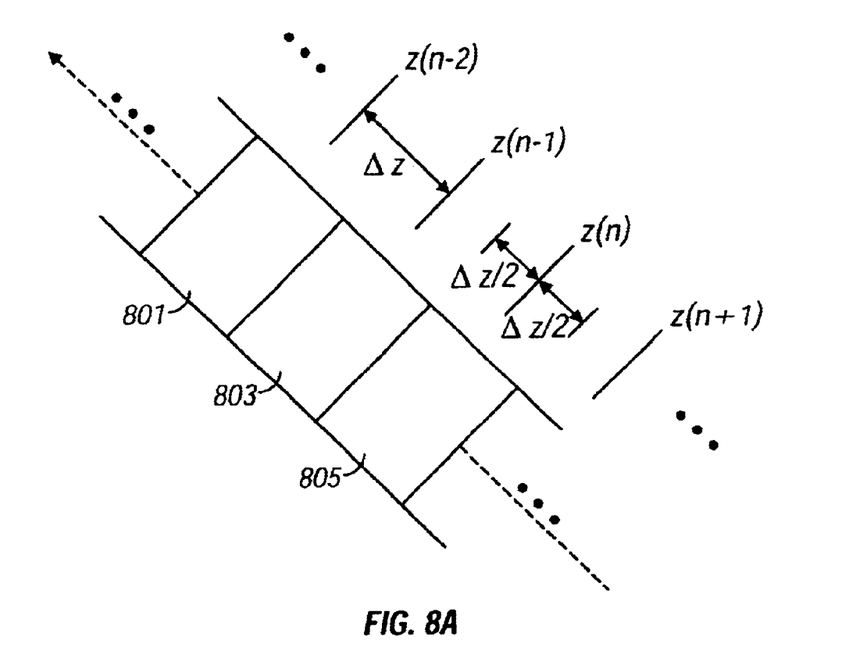
FIG. 8a shows the placement of depth bins of the invention.
Figure 8B:
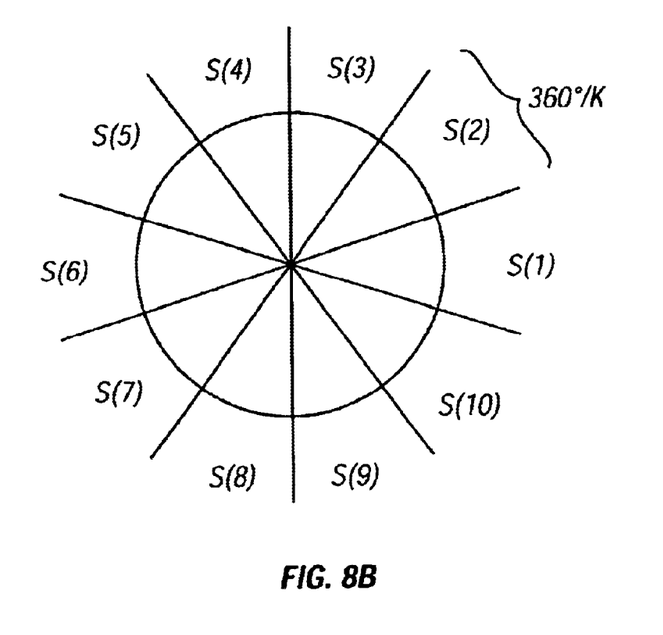
FIG. 8b shows the placement of azimuth bins of the invention.

A side view of the MWD tool, shown in FIG. 8a show the depth bins of the invention. Depth bins are labeled z(n−2), z(n−1), z(n), z(n+1), etc. Adjacent depth bins, such as, for example, 801 and 803, or 803 and 805 are separated by distances Δz. The length of a typical depth bin, such as the depth of bin 805, for example, is Δz so that the center of the bin is a distance Δz/2 from each side of the bin. Optionally, these measured data arrays could be placed in True Vertical Depth (TVD) when the well path trajectory survey data or well path design is incorporated in a TVD computation. A cross-section of the MWD tool, shown in FIG. 8b, shows the azimuthal angular positions within the borehole divided into ten sectors S(1), S(2), ... S(10), for example. One azimuth sector 2202 is labeled as an example. The actual number of sectors can be preselected by the operator for optimal use. Each sector has an angular width equal to 360°/K where K is the number of sectors. In the illustration of FIG. 8b, having 10 sectors, each sector would have an angular width of 36°.

Auxiliary measurements usually made with this type of tool such as inclinometer, gyroscope (fiber, mechanical, etc . . . ), accelerometers (1, 2, and 3 axis), and/or magnetometers provide additional data to recognize the drill path and also the relative position of the tool with respect to the formation while these measurements are performed. With this data available, it is possible to bin the measured raw data (RD) in two-dimensional bins plus well path and tool position data relative to the formation. The raw data can be organized in depth intervals (n) and azimuth sectors (k) clusters to obtain a raw data array $RD(n,k,t_i)$. $RD(n,k,t_i)$ is the raw data at depth interval n, sector k, and time $t_i$. A plurality of measured values at a given depth and azimuth sector can give rise to an average value for that depth and azimuth. In this case, the value can be obtained from the equation $$M(n,k)=AVG[F(RD(n,k,t_i))]$$

where M(n,k) is the measured value that is recorded at a given depth and azimuthal sector.

Following corrections made to the depth and relative azimuth angle acceleration, averaging is conducted in two steps to improve the signal to noise ratio. In a first step, measurements are obtained at at least one depth and at a plurality of angles. The measurements in each depth bin 701 (MD or TVD) and relative azimuth angle bin 703 are averaged to achieve improvements in signal to noise ratio (S/N). In a second step, the azimuthal measurements obtained at a given depth are fit to an associated a function of relative azimuth angle.

The raw data time series assigned to an azimuth sector might not have equal time interval sampling with respect to the transmitter source's periodic repeat cycle since the tool rotation very likely might not be synchronized with this transmitter source periodic repeat cycle. Time averaging of this reorganized raw data can reduce the signal to noise ratio and improve its accuracy by reducing the standard deviation of the raw data as shown by the equation:

$$\sigma_M(n,k) = \frac{\sigma_{RD}(n,k)}{\sqrt{N}}$$

where $\sigma_{RD}(n,k)$ represents the standard deviation of measurements taken at depth interval n and azimuth sector k. N is the number of measurement taken at a given depth and azimuth bin. The measured raw data time series is clustered in depth intervals and azimuth sectors and assigned to a relative time point within the transmitter source's periodic cycle time interval. Optionally, in at least one step, a portion of the tool could be stationary and pointed in a preferred azimuth direction while the raw data (RD) time series is acquired. The clustered in bins and averaged data M(n,k) for each depth interval n and azimuth sector k can form another array as illustrated in the following table:

|        | s(1)      | s(2)      | s(3)      | ... s(9)    | s(10)     |
|--------|-----------|-----------|-----------|-------------|-----------|
| ...    | ...       | ...       | ...       | ... ...     | ...       |
| ...    | ...       | ...       | ...       | ... ...     | ...       |
| z(n−1) | M(n−1,1)  | M(n−1,2)  | M(n−1,3)  | ... M(n−1,9)| M(n−1,10) |
| z(n)   | M(n,1)    | M(n,2)    | M(n,3)    | ... M(n,9)  | M(n,10)   |
| z(n+1) | M(n+1,1)  | M(n+1,2)  | M(n+1,3)  | ... M(n+1,9)| M(n+1,10) |
| ...    | ...       | ...       | ...       | ... ...     | ...       |
| ...    | ...       | ...       | ...       | ... ...     | ...       |

Figure 9:
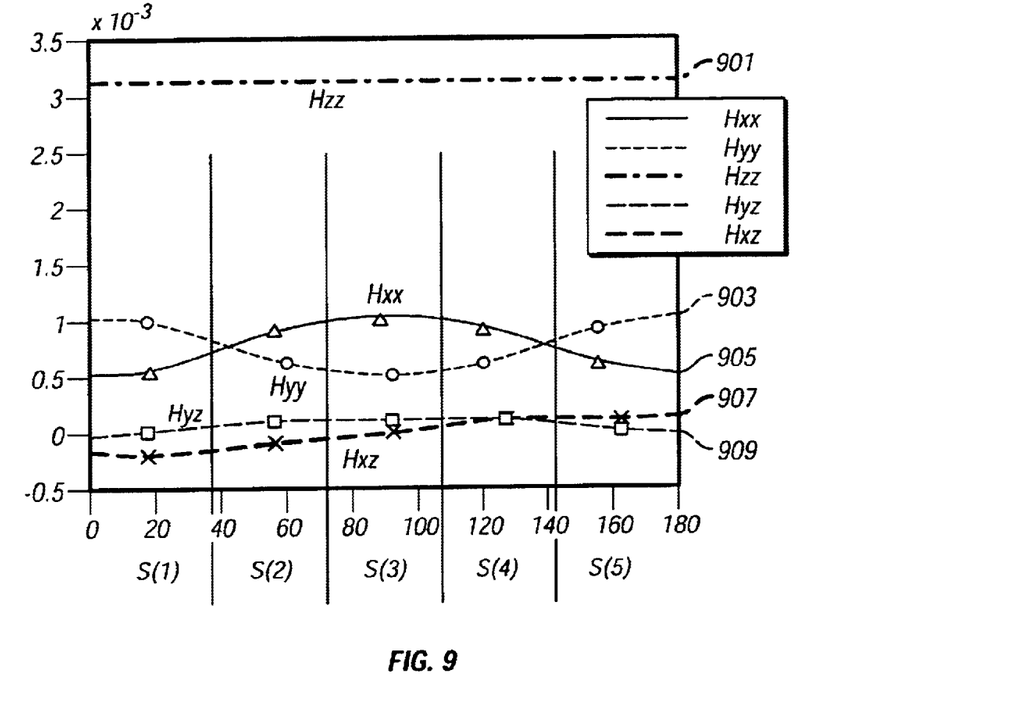
FIG. 9 illustrates fitting of formation data to associated functions.

During drilling planning, the well path is defined along a reservoir geological model with the reservoir physical parameter description including the resistivity targets associated with the objectives justifying the drilling the well. These resistivity targets have a characteristic response. FIG. 9 shows for example various azimuthal responses for certain multicomponent induction measurements (Hxx, Hyy, Hxz, Hyz) to resistivity layers. The averaged data, shown in the table above, can be used to estimate this expected azimuthal response of the measurement array to a specific formation target of known characteristics, and then this estimate can be used to interpret the parameters of the geometry (distance direction thickness) and material properties of this target. All examples shown in FIG. 9 follow a trigonometric sinusoidal function. $H_{xx}$ 905 and $H_{yy}$ 903 have two identical cycles per complete tool rotation and $H_{yz}$ 909 and $H_{xz}$ 907 have one symmetric cycle per tool rotation.

Figure 10:
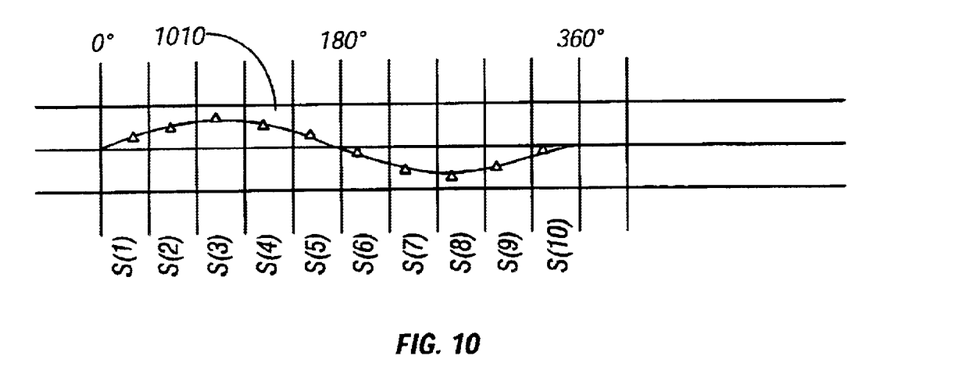
FIG. 10 a single selection of data being fit to an associated function.

Different targets will give rise to different functions. A typical associated function can be, for example, a sinusoidal curve. Failure to properly match the expected functions for a given measurement array and specified formation target could be displayed visually or in a summary report as those mismatches are identified (expected versus actual) or error between averaged array data M(n,k) and function estimate 1010 of the expected relationships associated with expected formation response (see FIG. 10). Actual data for various azimuth sectors and expected functions is illustrated in charts shown in FIG. 9, which contains four functions (F1 through F4). This information could be used for geo-steering, drilling and well placement decision while drilling.

This curve fitting procedure reduces the uncertainty in the results of the inversion processing due to the combined effect of the measurement's signal to noise ratio. This improvement occurs since coherent and correlated measurements are combined to estimate the best fit for the known sinusoidal function. The operator can choose a fitted measurement value at a selected angle for use in an inversion program. An inversion is performed on chosen data, including external relative azimuth reference data and utilizing a forward modeling, including the equations, relative angles, and the three-dimensional parameters described above.

Specifically, inversion of the measurements can give an estimate of a relative dip angle between the wellbore axis (the z-axis of the tool) and the bedding plane. In many instances, it is desired to drill a wellbore to stay within a particular reservoir formation (such as a sand layer having a shale above). Using the method described above, it is possible to take corrective action if the relative dip angle becomes too large—if uncorrected, the well would break out of the reservoir and enter a non-producing caprock such as a shale. The corrective action may be taken either by an operator at the surface or by using a downhole processor to adjust the drilling direction.

Another application would be to maintain the wellbore in a preferred position with respect to a fluid interface within a reservoir. The resistivity of a porous formation depends upon the fluid present therein, with water-wet zones having a lower resistivity than oil bearing formations and gas bearing formations.

As an alternative to performing an inversion, forward modeling could be used to predict expected response of a resistivity logging instrument along a desired wellbore and corrective action can be taken from the actual and/or averaged measurements. Such a method has been described with respect to propagation resistivity tools in U.S. Pat. No. Re 35,386 to Wu et al., having the same assignee as the present invention and the contents of which are fully incorporated herein by reference. An important difference between the teachings of Wu and the present invention is the increased sensitivity possible with the directional sensors used herein: the propagation resistivity tool of Wu being non-directional in nature.

Figure 11:
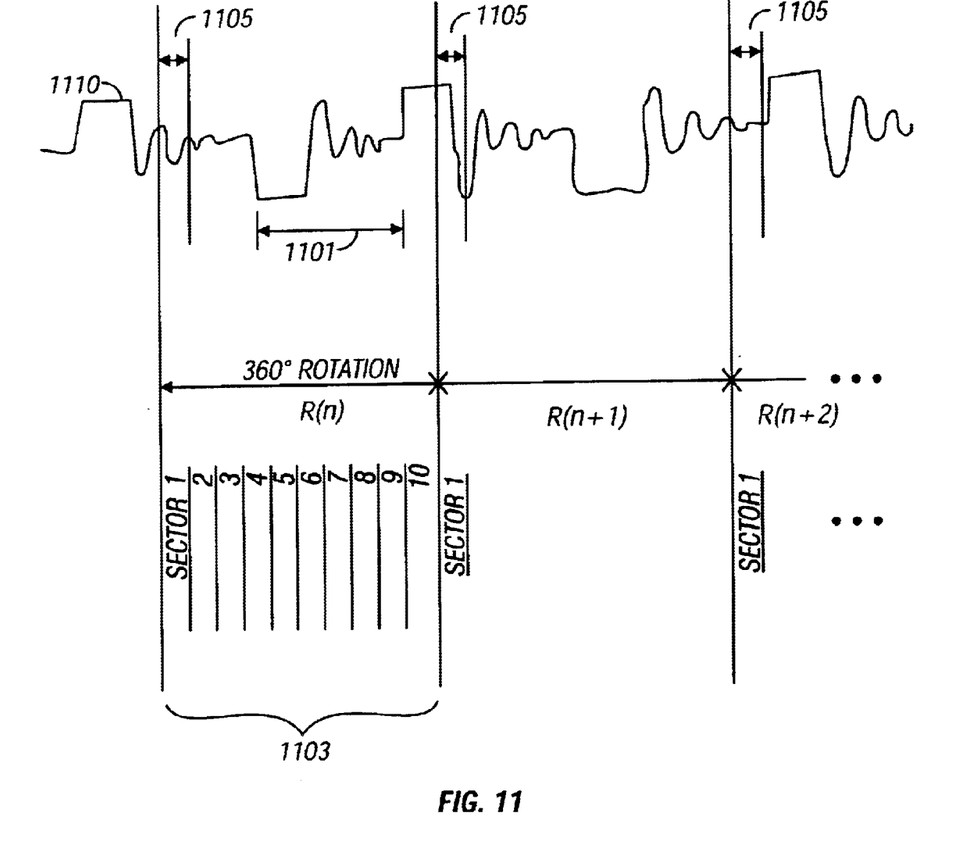
FIG. 11 illustrates the binning of formation data.

FIG. 11 describes timing synchronization aspects of transmitter repeat cycle time (Tr) 1101, tool rotation cycle time 1103, and sector time interval 1105 for an example having 10 azimuthal sectors. A transmitter signal 1110 is indicated. The figure indicates the averaging and organization of the azimuthal measurements as the source illuminates each azimuthal sector in sequence. Alternatively, the tool could be stationary while the measurements take place. An azimuthal measurement could come from different parts of the source waveform from one tool rotation to the next. The tool rotation and source can be synchronized to a particular azimuthal sector, and this can be gradually varied around all sectors. The source repeat cycle time can fall in three cases: i) The source repeat cycle can be less than the sector time interval; ii) The source repeat cycle can be more than the sector time interval but less than the tool rotation time interval; iii) The source repeat cycle can be more than the tool rotation time interval. In case iii) it is recommended to change the cyclic interval times (tool rotation and source) to fall into either case i) or case ii).

The data is interpreted for geo-steering application in association with other acquired microresistivity and image logs such as nuclear, resistivity, and acoustic borehole images. The transmitter can be on the surface or in a nearby well. Flexible circuits are also used in other auxiliary and complementary electromagnetic measurements for both geo-steering and formation evaluation.

As an alternative to or in addition to making measurements substantially continuously with a rotating sensor assembly followed by a curve fitting, an improvement in the signal to noise ratio can also be obtained by using signals from the orientation sensors as input to a downhole processor for triggering the acquisition of resistivity measurements at specified tool face angles. If the rate of penetration is slow, simply averaging the measurements made by each of the plurality of multicomponent resistivity sensors can give data of sufficient quality to perform an inversion.

Figure 12:
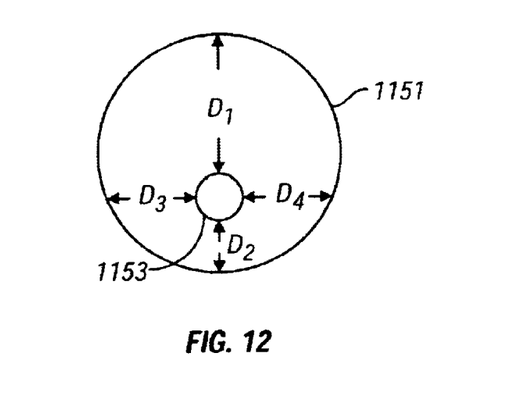
FIG. 12 illustrates the use of standoff measurements with the present invention.

There is a another pertinent aspect of the influence the rotation and position of an electromagnetic antenna with a transverse sensitivity direction as illustrated by a induction coil example with axis significantly tilted with respect to the tool's longitudinal axis. Wang et al. (SPWLA 2001) has shown an example involving a transverse induction coil which can be affected by borehole eccentricity perpendicular to the electromagnetic antenna axis of spatial sensitivity symmetry. This is illustrated in FIG. 12 wherein a tool 1153 is shown at an eccentric position within borehole 1151. Similar effects are notied when the borehole is not circular, and the term "eccentricity" is used hereafter to include both an eccentric tool within a circular borehole as well as a non-circular borehole.

Using an acoustic or other caliper, distances to the borehole wall in different directions, denoted by $d_1$, $d_2$, $d_3$, and $d_4$ are shown. Wang shows that this eccentricity affects measurements made by the transverse induction coils. There are two ways of correcting for the effects of this eccentricity.

In a preferred embodiment of the invention, multifrequency focusing is used to correct for the effects of this eccentricity. U.S. Pat. No. 5,884,227, issued to Rabinovich et al., having the same assignee as the present invention, is a method of adjusting induction receiver signals for skin effect in an induction logging instrument including a plurality of spaced apart receivers and a transmitter generating alternating magnetic fields at a plurality of frequencies. The method includes the steps of extrapolating measured magnitudes of the receiver signals at the plurality of frequencies, detected in response to alternating magnetic fields induced in media surrounding the instrument, to a response which would be obtained at zero frequency. A model of conductivity distribution of the media surrounding the instrument is generated by inversion processing the extrapolated magnitudes. Rabinovich '227 works under the assumption that the induction tool device has perfect conductivity. In a measurement-while-drilling device, this assumption does not hold. However, a U.S. patent application of Tabarovsky filed on 15 Nov. 2002 under attorney docket number 414-29441 having the same assignee as the present application and the contents of which are fully incorporated herein by reference, teaches a method of correcting the measurements made in a MWD logging tool having a finite conductivity to one that would be obtained with an idealized instrument having infinite conductivity, following which multifrequency focusing may be used.

An alternate method of dealing with eccentricity is to perform an inversion of the data using the known geometry of the borehole and the position of the logging tool within the borehole. Preferably, such an inversion should be based on a known value of resistivity of the mud in the borehole.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for a determining a resistivity property of earth formation penetrated by a borehole, the method comprising:
   (a) conveying a logging tool to at least one depth within said borehole;
   (b) using a plurality of resistivity sensors each obtaining measurements indicative of said property at a plurality of tool-face angles of said logging tool within the borehole at said at least one depth during rotaton of said tool;
   (c) binning measurements made by each of said plurality of resistivity sensors into azimuthal bins;
   (d) for each of said plurality of resistivity sensors, representing said binned measurements by an associated function of said tool-face angles; and
   (e) determining said resistivity property from said plurality of associated functions.

2. The method of claim 1 wherein said logging tool is conveyed on one of (i) a wireline, and, (ii) a drilling tubular.

3. The method of claim 1 further comprising using an orientation sensor selected from (i) an accelerometer, (ii) a magnetometer, and, (iii) a gyroscope, for obtaining a measurement of said tool-face angles.

4. The method of claim 1 wherein each of said associated functions is substantially a sinusoid.

5. The method of claim 1 wherein said resistivity property further comprises at least one of (i) a horizontal resistivity of the earth formation, (ii) a vertical resistivity of the earth formation, (iii) a length of an invaded zone of the earth formation, and, (iv) a resistivity of an invaded zone of the earth formation.

6. The method of claim 1 wherein said borehole is substantially horizontal.

7. The method of claim 1 wherein said logging tool is conveyed on a drilling tubular, the method further comprising controlling a direction of drilling based on said determined resistivity property.

8. The method of claim 1 wherein said at least one depth further comprises a plurality of depths, the method further comprising averaging said binned measurements for each of said plurality of sensors over said plurality of depths.

9. The method of claim 8 further comprising using an accelerometer for obtaining values of said plurality of depths.

10. The method of claim 1 wherein said plurality of resistivity sensors further comprises a plurality of transmitter-receiver pairs having axes inclined to a longitudinal axis of said borehole.

11. The method of claim 10 wherein said transmitters and receivers further comprise transmitters and receivers aligned along x-, y- and z-axes.

12. The method of claim 1 further comprising:
   performing (b) of claim 1 at a plurality of frequencies and performing multifrequency focusing of said measurements made at said plurality of frequencies prior to (c) of claim 1.

13. The method of claim 12 further comprising correcting said multifrequency measurements for a finite conductivity of a mandrel of said logging tool.

14. The method of claim 1 wherein determining said resistivity property further comprises performing an inversion of values of said associated functions at a selected tool-face angle.

15. The method of claim 14 wherein performing said inversion further comprises:
   (A) defining an initial model of said plurality of layers, said initial model including, for each of said plurality of layers,
      (I) a horizontal resistivity,
      (II) a vertical resistivity,
   (B) determining expected responses of the logging tool to said model;
   (C) defining a data objective function related to a difference between said expected responses and said measurements made with the multicomponent logging tool;
   (D) iteratively updating said model thereby reducing a global objective function, said global objective function comprising a sum of said data objective function and a model objective function related to changes in said model at each iteration.

16. The method of claim 15 wherein the earth formation further comprises an invaded zone, the method further comprising obtaining using an array resistivity logging tool for obtaining measurements indicative of properties of said invaded zone, said initial model further comprising:
   (E) a length of an invaded zone, and
   (F) a resistivity of the invaded zone.

17. The method of claim 15 further comprising:
   (i) making a plurality of measurements with a caliper, and
   (ii) using said plurality of measurements as part of said initial model.

18. An apparatus for determining a resistivity property of an earth formation at least one depth within a borehole penetrating said earth formation, comprising:
   (a) a logging tool having a plurality of resistivity sensors for obtaining measurements indicative of said resistivity property, said resistivity sensors making measurements at a plurality of tool face angles during rotation of said logging tool;
   (b) at least one orientation sensor for obtaining measurements indicative of said plurality of tool-face angles; and
   (c) a processor which:
      (A) azimuthally bins said measurements made by each of said plurality of resisitivity sensors,
      (B) applies a fitting function to each of said binned measurements made by each of said plurality of resisitivity sensors, and
      (C) determines said resistivity property from said fitting functions corresponding to each of said resistivity sensors.

19. The apparatus of claim 18, wherein said at least one depth further comprises a plurality of depths, the processor further combining measurements at said plurality of depths for determining said resistivity property.

20. The apparatus of claim 18, wherein said resistivity property further comprises at least one of (i) a horizontal resistivity of the earth formation, (ii) a vertical resistivity of the earth formation, (iii) a length of an invaded zone of the earth formation, and, (iv) a resistivity of an invaded zone of the earth formation.

21. The apparatus of claim 18, wherein said fitting function further comprises a sinusoid.

22. The apparatus of claim 18, wherein said plurality of resistivity sensors further comprises a plurality of transmitter-receiver pairs having axes inclined to a longitudinal axis of said borehole.

23. The apparatus of claim 22, wherein said transmitters and receivers further comprise transmitters and receivers aligned along x-, y-, and z-axes.

24. The apparatus of claim 18, wherein said at least one orientation sensor further comprises one of (i) an accelerometer, (ii) a magnetometer, and, (iii) a gyroscope.

25. The apparatus of claim 24, wherein the processor further determines from an accelerometer said plurality of depths.

26. A method for determining a resistivity property of earth formation penetrated by a borehole, the method comprising:
   (a) conveying a logging tool on a drilling assembly into said borehole;
   (b) making measurements indicative of a toolface angle of said drilling assembly while said assembly is rotating, and providing said angle measurements to a downhole controller;
   (c) using said downhole controller for making measurements indicative of said resistivity property with a plurality of multicomponent resistivity sensors, at a specified toolface angle determined from said angle measurements; and
   (d) determining said resistivity property from said measurements made by said multicomponent resistivity sensors.

* * * * *